Figure 1:
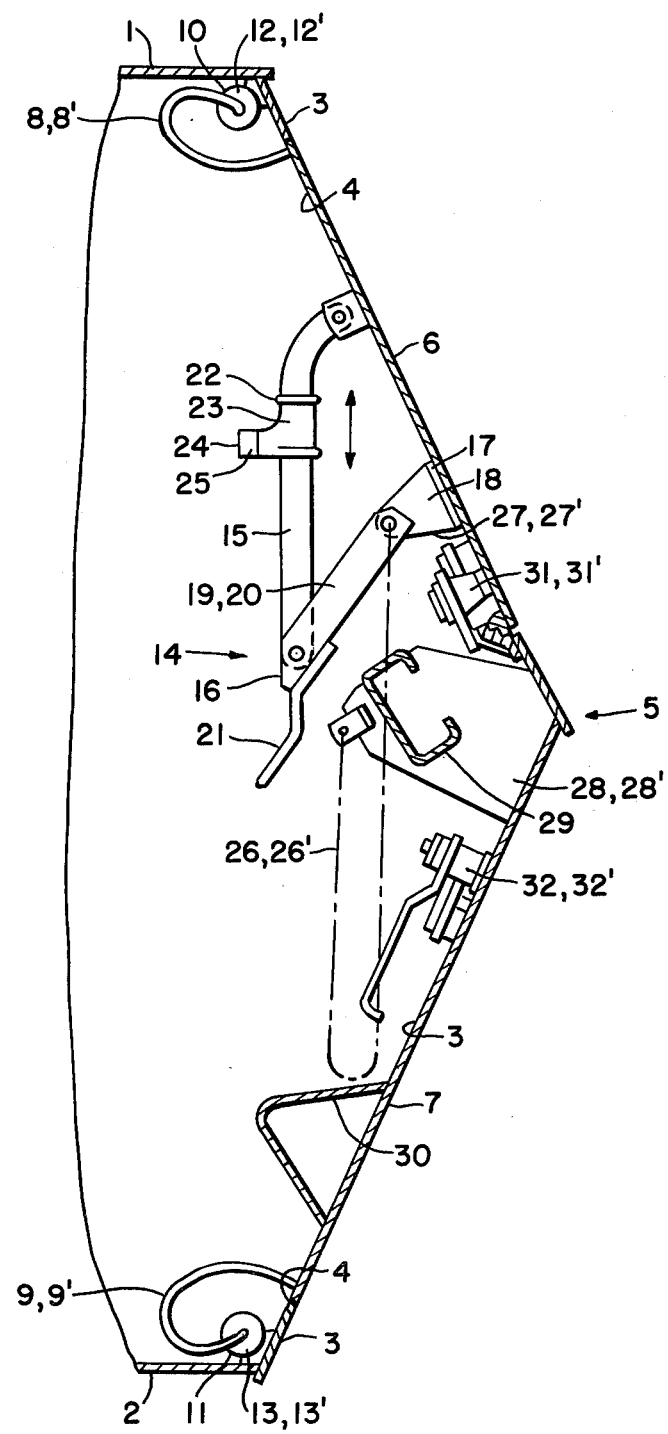

United States Patent [19]
Hantel

[11] 4,441,754
[45] Apr. 10, 1984

[54] REAR DOOR FOR ARMORED VEHICLES

[75] Inventor: Alwin Hantel, Espenau, Fed. Rep. of Germany

[73] Assignee: Thyssen Industrie Aktiengesellschaft, Essen, Fed. Rep. of Germany

[21] Appl. No.: 349,578

[22] Filed: Feb. 17, 1982

[30] Foreign Application Priority Data

Feb. 19, 1981 [DE] Fed. Rep. of Germany ....... 3106117

[51] Int. Cl.³ .............................................. B62D 25/00
[52] U.S. Cl. ...................................... 296/51; 296/56; 296/57 R; 296/62; 49/109
[58] Field of Search ................. 296/56, 57 R, 62, 146; 49/109, 104, 114, 366, 367, 339; 292/277

[56] References Cited

U.S. PATENT DOCUMENTS

| 544,773 | 8/1895 | Schill | 49/109 |
| 2,249,932 | 7/1941 | Beal | 49/109 |
| 2,361,403 | 10/1944 | Kabot | 292/277 |
| 4,024,671 | 5/1977 | Isobe | 296/51 |

Primary Examiner—Robert R. Song
Attorney, Agent, or Firm—Becker & Becker

[57] ABSTRACT

A rear door for an armored vehicle. The rear door includes an upper door half and a lower door half which are pivotally hinged to the rear wall of the vehicle and can be locked and made tight in the closed position. The lower door half is provided on its inner side with steps for getting into and out of the vehicle, and is held in its lowered open position via a chain pull, a cable line, or an arresting member. Each door half, via swivel levers fastened to the inner side of the door half, is pivotally mounted on a shaft which extends in the transverse direction of the vehicle and is supported in bearing housings which are rigidly arranged to the side of, and above and below, the door opening on the inner side of the rear wall of the vehicle. Each shaft includes a rotating rod and serves to aid the pivot movement during closing. The upper door half is movable by means of a swivel device which includes a push-pull rod and a lever, and can be arrested in its raised open position. The free end of the lever is pivotally connected with the inner side of the rear wall of the vehicle by means of a bracket, and the free end of the rod is pivotally connected with the inner side of the door. The lever is provided with a rigid handle.

6 Claims, 2 Drawing Figures

REAR DOOR FOR ARMORED VEHICLES

The present invention relates to a rear door for armored vehicles, and comprises an upper door half and a lower door half which are pivotally hinged on the rear wall of the vehicle and can be locked and made tight in the closed position; the lower door half is provided on its inner side with steps for getting in and out, and is held in its lowered open position by means of a chain pull, a cable line, or an arresting member.

A similar rear door is disclosed, for example, in the prospectus "Henschel Wehrtechnik UR 416" of 12/76. For this purpose, hinged joints are fastened on the outside of the rear wall of the vehicle and on the outside of the door for the door connection. When the door is closed, these hinged joints project beyond the plane of the rear wall of the vehicle, and can be easily damaged by external influences. In addition, opening and closing the door, especially the upper door half, is often very difficult and dangerous, especially, when the vehicle is tilted to the side, or when driving over uneven terrain, during which the vehicle is strongly jarred, because these conditions cause unequal weight components. This is all the more so if a given procedure of the operator, who at the same time is a crew member, is carried out with only one hand because the other hand must be free, for example, for a weapon.

It is therefore an object of the present invention to design a rear door of the above described general type in such a way that it can be handled easily and safely without expending much energy, with the hinged connections of the rear door being accommodated in such a way that they are protected against artillery bombardment.

Figure 2:
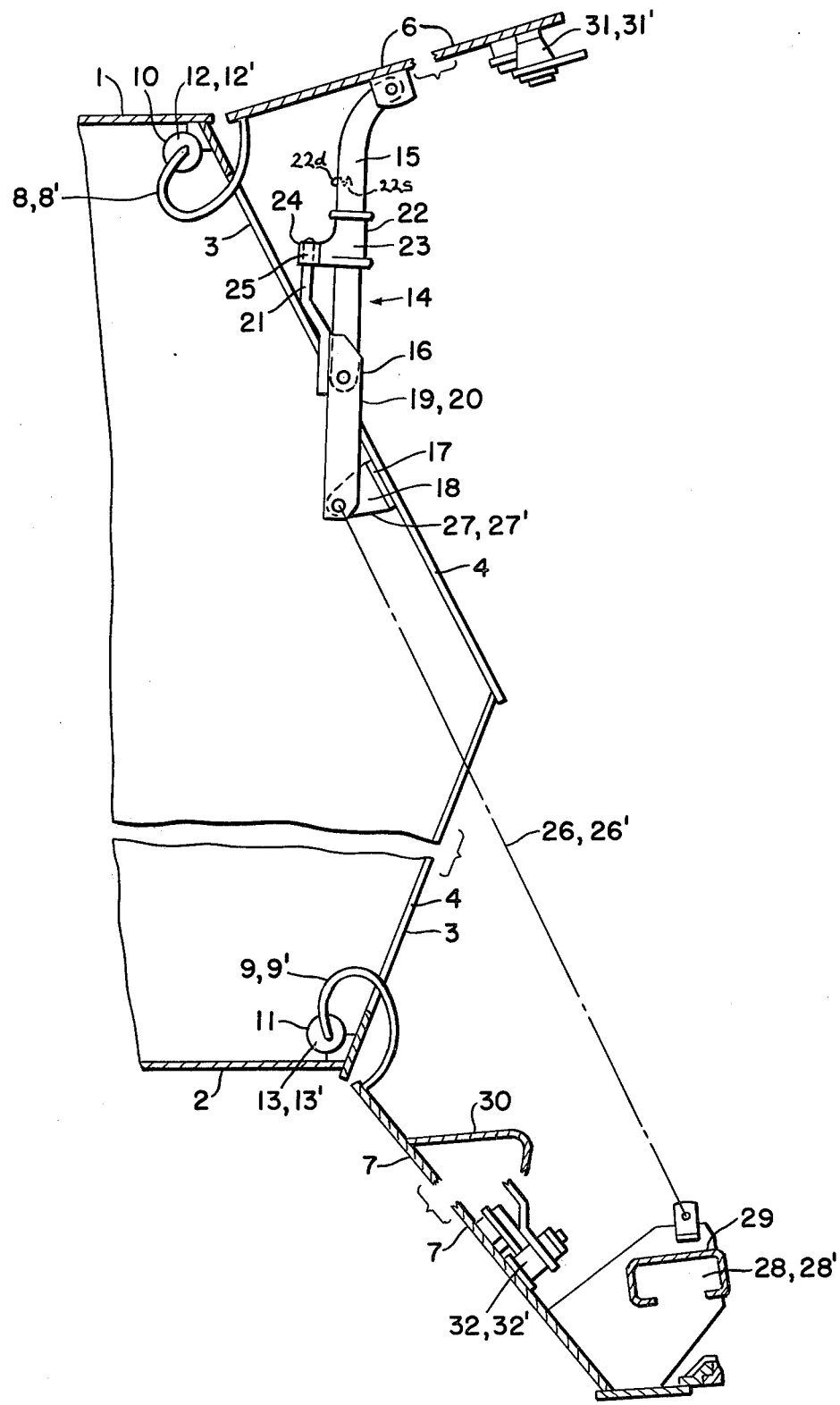

This object, and other objects and advantages of the present invention, will appear more clearly from the following specification in connection with the accompanying drawings, in which:

FIG. 1 is a partially sectioned schematic side view of one embodiment of the invention rear portion of an armored vehicle, with the two-part rear door being shown in the closed state; and FIG. 2 shows the inventive rear door of FIG. 1 in the opened state, with the upper door half being arrested.

The rear door of the present invention is characterized primarily in that each door half, by means of swivel levers fastened to its inner side, is pivotally mounted on a shaft which extends in the transverse direction of the vehicle and is supported in bearing housings which are rigidly arranged laterally, and above and below the door opening, on the inner side of the rear wall of the vehicle; in that each shaft comprises a rotating rod and serves to aid the pivot or swivel movement during closing; and in that the upper door half is movable by means of a swivel device comprising a push-pull rod and a lever, and can be arrested in its raised opened position, with the free end of the lever being pivotally connected with the inner side of the rear wall of the vehicle by means of a bracket, and the free end of the rod being pivotally connected with the inner side of the door, and with the lever being provided with a rigid handle.

With this inventive construction, the rotating rod springs, as door hinges, effect an aiding of the pivotal or swivel movements during closing in the sense of a balancing of weight. In addition, when the door is closed, no obstructing structural components project outwardly beyond the rear of the vehicle. Furthermore, as a result of the swivel device on the upper door half, the energy which has to be expended in order to open and close this door half is kept as low as possible. Also, the components which take part in the opening and closing procedures are accommodated in such a way that they are protected against breakdown or failures, so that normally no additional maintenance costs result. Finally, the contour of the upper opened door half is located within turning radius of the vehicle. As a result, driving through curves can be carried out without any problems.

According to further specific advantageous embodiments of the present invention, the lever of the swivel device, which simultaneously serves as a door support, comprises two lever arms which are hinged with the push-pull rod and between which this rod is received; the lever arms are supported on a common bracket which in turn is fastened to a bracket.

Associated with the handle may be a holder which is connected with a push-pull rod and is displaceable in the longitudinal direction of this rod. The holder may essentially comprise a sleeve which is provided with an angled-off arm which has an opening parallel to the axis of the sleeve for receiving the handle. The holder may be arrested on the push-pull rod in its rest position and in its operating position by means of a detent.

Referring now to the drawings in detail, shown in section of the rear portion of the armored vehicle are the tank roof 1, the tank floor 2, and the rear wall 3 which connects these two parts with one another.

An opening 4 is provided in the rear wall 3 to allow the crew members to get in and out. This opening 4 can be closed off by a two-part rear door 5 which comprises an upper and lower door half 6 and 7. By means of swivel levers 8, 8' and 9,9' fastened on the inside of the door halves 6,7, each door half 6,7 is mounted so as to be able to swing on a shaft 10,11 arranged in the transverse direction of the vehicle. The shafts 10 and 11 respectively comprise a rotating rod, the ends of which are supported in bearing housings 12, 12', or 13, 13'. These bearing housings are respectively fastened laterally on the inner side of the rear wall 3 of the vehicle above or below the door opening 4. Each rotating rod preferably comprises a plurality of mated or joined together flat bars.

To open and close the upper door half 6, as well as to arrest the upper door half 6 in its open position, there is provided a swivel device 14, one end of which is hinged on the inner side of the door half 6, and the other end of which is hinged on the inner side of the rear wall 3 of the vehicle. This swivel device 14 comprises two parts, and is provided with a joint. A push-pull rod 15, which is associated with the upper door half 6, is supported on a lever 16, which in turn is supported on a second bracket 18 which is rigidly connected with the rear wall 3 of the vehicle by means of a first bracket 17. The lever 16 essentially comprises two lever arms 19 and 20 which are arranged parallel to one another and between which is located the push-pull rod 15. One of the two lever arms 19,20 has a rigid handle 21 at that end thereof closest to the push-pull rod 15 for actuating the swivel device 14. The handle 21 is arrested in its upper final position, i.e. when the upper door half is opened to the maximum extent, by a holder 22 located on the push-pull rod 15. This holder 22 comprises a sleeve 23 which surrounds the push-pull rod 15 and is displaceable in the longitudinal direction of the rod, and further comprises an angled-off arm 24 which has an opening 25 for receiving the handle 21. The holder 22 can be arrested in either of its two end positions by means of a detent 22d, which may be spring-biased (22S in FIG. 2).

Due to its center of gravity, the lower door half 7 automatically pivots downwardly out of its closed position and is held in its open lowered position, on both sides, by means of chains 26, 26', or by means of an arresting member. One end of each chain 26, 26' is fastened to a suspension 27, 27' arranged on the rear wall 3 of the vehicle next to the door opening 4; the other end of each chain 26, 26' is fastened to a traverse or bar 28, 28' located on the inner side of the door half 7. The lower door half 7 is closed by pulling in these chains 26, 26'. The two traverses 28 and 28' simultaneously serve as side plates for one of the steps 29, 30 placed on the inner side of the lower door half 7.

In order to achieve a tight closure, locking devices 31, 31' and 32, 32' are respectively arranged on the inner side of the upper and lower door halves 6 and 7. Each of these locking devices is provided with a handle and a swivel locking bar. In the closed position, the swivel locking bars of the locking devices are supported on wedge-shaped surfaces. For the locking devices of the upper door half, these wedge-shaped surfaces are located on the lower door half 7, and for the lower door half, these wedge-shaped surfaces are arranged on the inner surfaces of the rear wall 3 of the vehicle. The locking devices are appropriately designed so that each door half can be locked or unlocked from the outside. Furthermore, it is also possible to carry out the swiveling of the door halves with hydraulic working cylinders arranged in the longitudinal direction of the vehicle instead of with the manual actuation described above.

The present invention is, of course, in no way limited to the specific disclosure of the specification and drawings, but also encompasses any modifications within the scope of the appended claims.

What I claim is:

1. A rear door for a door opening in the rear wall of an armored vehicle having an interior, including in combination:
    an upper door half pivotally connected to said rear wall of said vehicle and adapted to be locked and made tight in a closed position, and to be pivoted into, and arrested in, an open position;
    a lower door half pivotally connected to said rear wall of said vehicle and adapted to be locked and made tight in a closed position, said lower door half being provided with means for holding same in a lowered open position, with the inner side of said lower door half being provided with steps for getting in and out of said vehicle;
    a lower edge portion of said upper door half covering an upper edge portion of said lower door half for holding said lower door half in said closed position;
    bearing housings respectively rigidly arranged on the inner side of said rear vehicle wall to the side of and respectively above and below said door opening;
    a shaft for each door half, each shaft extending in the transverse direction of said vehicle and being supported in associated ones of said bearing housings; each shaft comprising a rotating rod and serving to aid in pivotal movement of said door halves;
    swivel levers respectively fastened to the inner sides of said door halves and to said shafts for effecting pivotal mounting of each door half to an associated shaft; and
    a swivel device for effecting movement of said upper door half and for effecting arresting thereof in said open position; said swivel device including a push-pull rod pivotally connected to the inner side of said upper door half, and a lever pivotally connected to said push-pull rod and to the inner side of said rear wall of said vehicle, with said lever being provided with a rigid handle whereby said upper door half is actuated from the vehicle interior with only one hand being needed to actuate door opening movement of both said upper and lower door halves since only the upper door half needs to be open so far until said covering is eliminated with respect to the lower door half because of position of center of gravity automatically to pivot downwardly from closure position thereof.

2. A rear door in combination according to claim 1, which includes a first bracket rigidly connected to said rear wall of said vehicle, said first lever being pivotally connected to said bracket to effect said pivotal connection of said lever to said rear wall of said vehicle.

3. A rear door for a door opening in the rear wall of an armored vehicle, including:
    an upper door half pivotally connected to said rear wall of said vehicle and adapted to be locked and made tight in a closed position, and to be pivoted into, and arrested in, an open position;
    a lower door half pivotally connected to said rear wall of said vehicle and adapted to be locked and made tight in a closed position, said lower door half being provided with means for holding same in a lowered open position, with the inner side of said lower door half being provided with steps for getting in and out of said vehicle;
    bearing housings respectively rigidly arranged on the inner side of said rear vehicle wall to the side of and respectively above and below said door opening;
    a shaft for each door half, each shaft extending in the transverse direction of said vehicle and being supported in associated ones of said bearing housings; each shaft comprising a rotating rod and serving to aid in pivotal movement of said door halves;
    swivel levers respectively fastened to the inner sides of said door halves and to said shafts for effecting pivotal mounting of each door half to an associated shaft;
    a swivel device for effecting movement of said upper door half and for effecting arresting thereof in said open position; said swivel device including a push-pull rod pivotally connected to the inner side of said upper door half, and a lever pivotally connected to said push-pull rod and to the inner side of said rear wall of said vehicle, with said lever being provided with a rigid handle;
    a first bracket rigidly connected to said rear wall of said vehicle, said lever being pivotally connected to said first bracket to effect said pivotal connection of said lever to said rear wall of said vehicle, said lever of said swivel device comprising two lever arms which are pivotally connected to said push-pull rod and receive the latter between them; and which rear door includes a second bracket interposed between said lever arms and said first first bracket, to which it is fastened, said two lever arms being pivotally connected to said second bracket.

4. A rear door according to claim 3, which includes a holder operatively associated with said handle, said holder being connected with said push-pull rod and being displaceable in the longitudinal direction thereof and relative thereto.

5. A rear door according to claim 4, in which said holder comprises a sleeve which surrounds said push-pull rod, said sleeve being provided with an angled-off arm having an opening parallel to the axis of said sleeve for receiving said handle therein.

6. A rear door according to claim 5, which includes a detent associated with said push-pull rod for arresting said holder thereon in a rest position and in an operating position.

* * * * *